(12) United States Patent
Matsuo et al.

(10) Patent No.: US 6,994,054 B2
(45) Date of Patent: Feb. 7, 2006

(54) ANIMAL LITTER BOX

(75) Inventors: Takayuki Matsuo, Tokyo (JP); Takeshi Ikegami, Tokyo (JP)

(73) Assignee: Uni-Charm Petcare Corporation, Tokyo (JP)

( * ) Notice: Subject to any disclaimer, the term of this patent is extended or adjusted under 35 U.S.C. 154(b) by 0 days.

(21) Appl. No.: 10/739,851

(22) Filed: Dec. 18, 2003

(65) Prior Publication Data

US 2004/0261727 A1 Dec. 30, 2004

(30) Foreign Application Priority Data

Jun. 20, 2003 (JP) .............................. 2003-177386

(51) Int. Cl.
*A01K 29/00* (2006.01)

(52) U.S. Cl. ..................................... 119/166
(58) Field of Classification Search ............... 119/170, 119/161, 165, 166
See application file for complete search history.

(56) References Cited

U.S. PATENT DOCUMENTS

| 3,818,865 A * | 6/1974 | Sinclair ....................... 119/161 |
| 5,184,574 A * | 2/1993 | Kirk et al. .................. 119/162 |
| 5,193,488 A | 3/1993 | Walton |
| 5,289,800 A | 3/1994 | Walton |
| 5,329,879 A | 7/1994 | Walton |
| 5,353,743 A | 10/1994 | Walton |
| 5,983,831 A * | 11/1999 | Thompson .................. 119/165 |
| 6,109,212 A * | 8/2000 | Schacherbauer ............ 119/165 |
| 6,237,534 B1 * | 5/2001 | Schwartz ..................... 119/165 |
| 6,332,429 B1 * | 12/2001 | Gramlich .................... 119/165 |
| 6,412,440 B2 * | 7/2002 | Kobayashi .................. 119/161 |
| 6,487,989 B2 * | 12/2002 | Yamamoto .................. 119/161 |
| 6,510,814 B1 * | 1/2003 | Vargas ........................ 119/165 |
| 6,578,520 B2 * | 6/2003 | Otsuji et al. ................ 119/165 |
| 2003/0116095 A1 | 6/2003 | Otsuji |

* cited by examiner

*Primary Examiner*—Son T. Nguyen
(74) *Attorney, Agent, or Firm*—Butzel Long

(57) ABSTRACT

An animal litter box is to be provided that can be cleaned easily and can reduce the number of time to change an animal litter, particularly an animal litter box that allows liquid such as urine evacuated onto the granular materials to move to a liquid-absorbing sheet efficiently. An animal litter box includes a granular material container having an opening for an animal going in and out, and a liquid penetrating bottom part on which granular materials are dispersed; and a liquid-absorbing sheet holder placed under the bottom part of the granular material container on which a liquid-absorbing sheet is placed, wherein the bottom part of the granular material container has a liquid leading part formed by connected arches on a side facing the liquid-absorbing sheet.

13 Claims, 9 Drawing Sheets

ANIMAL LITTER BOX

BACKGROUND OF THE INVENTION

1. Field of the Invention

The present invention relates to an animal litter box for animals kept in rooms such as cats and dogs, which can be cleaned easily and can reduce an amount of animal litter to be discarded as waste.

2. Description of Related Art

A plastic container in which granular materials called animal litter are contained has been used as an animal litter box for animals kept in rooms such as cats and dogs. Mineral materials such as zeolite, river sand and bentonite which becomes hard when it absorbs liquid like urine, and cellulose grains made of crushed pulp hardened to shape granular. An animal such as a cat enters the animal litter box, and evacuates urine or feces on the animal litter. An owner removes the animal litter soiled with urine or feces with a scoop along with feces out of a container, and replenishes new animal litter in accordance with an amount of the animal litter removed.

However, since pet animals like cats have the habit of mixing animal litter with their paws after evacuation, an amount of animal litter soiled with urine or feces is increased and the soiled animal litter is scattered. Thus, it is difficult to remove only the soiled animal litter. Furthermore, the zeolite and river sand do not absorb urine, and bentonite and cellulose grains absorb urine to some extent but cannot absorb it completely. On this account, urine passes through the litter and tends to be held in the container. Therefore, the owner needs not only discard a part of the animal litter at every time of animal evacuation but also needs to change all of the animal litter contained in the container once a week or two weeks, to clean and dry the container, and to place new litter in the container for keeping the animal litter box cleaned. It increases an amount of animal litter to be discarded. Moreover, when mineral sand such as zeolite is used as the animal litter, it is difficult to be discarded as waste, because it is non-combustible.

As a product to solve the problems mentioned above, an animal litter box disclosed in Japanese unexamined patent publication No. 10-229768-A (Patent Document 1) is developed, for example. In the animal litter box disclosed in patent Document 1, a plurality of water repellent granular materials are placed in a container having a bottom part comprising a sheet with liquid passing structure. A liquid-absorbing sheet supported by a support body is disposed under the bottom part of the container in close contact with the sheet, in which urine passes through the water repellent granular materials and through the bottom part of the container, and then is absorbed into the liquid-absorbing sheet. Accordingly, since urine does not remain in the container, the animal litter box is cleaned only by changing the liquid-absorbing sheet once a day. It is fine that the entire granular materials are changed once a month or two months. The animal litter box ca save the trouble to change the animal litter and can reduce an amount of waste.

However, the liquid-absorbing sheet supported by the support body is disposed under the bottom of the container in contact with the bottom in this traditional example. Thus, when an amount of urine absorbed into the liquid-absorbing sheet is increased by long time use, urine returns back to the granular materials to soil the entire granular materials. Moreover, the liquid-absorbing sheet should be changed once a day, waste is generated everyday even though it occurs once a day, being troublesome.

SUMMARY OF THE INVENTION

The present invention has been made in view of the problems mentioned above. An object of the present invention is to provide an animal litter box that can be cleaned easily and can reduce the number of times of changing animal litter.

As a result of diligent investigation done by the inventors in order to achieve the object, they found that urine is allowed to move to a liquid-absorbing sheet efficiently when an animal litter box, which has a container for storing granular materials and a liquid-absorbing sheet holder for placing a liquid-absorbing sheet for absorbing urine, is equipped with a liquid leading part formed by connected arches which is disposed on the side facing the liquid-absorbing sheet in the bottom part of the granular material container.

More specifically, the invention is to provide the following.

(1) An animal litter box comprising a granular material container having an opening for an animal going in and out, and a liquid passing bottom part on which granular materials are dispersed; and a liquid-absorbing sheet holder placed under the bottom part of the granular material container on which a liquid-absorbing sheet is placed, wherein the bottom part of the granular material container has a liquid leading part formed by connected arches on a side facing the liquid-absorbing sheet.

According to this invention, a predetermined amount of the granular materials is contained in the granular material container having the bottom part of the liquid passing structure. Urine evacuated onto the granular materials passes through spaces among the granular materials, drips from the bottom part which allows the urine to pass through to the liquid-absorbing sheet placed thereunder, and is absorbed into the liquid-absorbing sheet.

Since the granular material container has the bottom having the liquid leading part, the drops of urine aggregate along the liquid leading part and move smoothly to the liquid-absorbing sheet. Moreover, since the liquid-absorbing sheet is placed under the bottom part of the granular material container at the position facing thereto in a predetermined distance apart, urine evacuated onto the granular materials passes through the liquid passing bottom part, moves to the back side (the side facing the liquid-absorbing sheet) of the bottom part, and is efficiently collected along the liquid leading part formed by connected arches on the back side of the bottom part, and then, drips onto the liquid-absorbing sheet placed thereunder for absorption.

Furthermore, since the liquid-absorbing sheet is not in contact with the bottom part of the granular material container, liquid such as urine having been absorbed into the liquid-absorbing sheet does not return back to the bottom part of the container. Therefore, since the liquid like urine does not return to the animal litter container, it can be avoided that all of the granular materials is soiled by the returned urine. It follows that the number of times to change the granular materials changed can be reduced, saving trouble and reducing an amount of waste.

Here, the liquid passing bottom part is such a product that allows liquid such as urine evacuated onto the granular materials to easily pass from the top side (the side in contact with the granular materials) of the bottom part of the granular material container to the back side (the side facing the liquid-absorbing sheet). The liquid passing bottom part has a plurality of opening parts which makes the bottom part meshed or striped. It is preferable that the opening part has dimensions smaller than those of the granular material so as not to transfer the granular materials dispersed on the bottom part. Furthermore, the bottom part is required to have strength that it is not damaged when an animal such as a cat is on it as well as the property that allows liquid such as urine to transfer smoothly. To this end, a ratio of the total opening area formed by a plurality of the opening parts to area of the bottom part (it is called an open area ratio) is 25 to 50%, preferably 40 to 45%.

Moreover, the liquid leading part is for allowing liquid such as urine that has passed through the opening parts of the bottom part to efficiently drip from the bottom part onto the liquid-absorbing sheet. The liquid leading part is formed by connected circular arches projecting toward the bottom part from the liquid-absorbing sheet side. Liquid is led along the circular arches, aggregates on the legs of the arches where arches laying side-by-side are connected each other, and then efficiently drips from the bottom part. It is preferable that the circular arch part has a chord length of 6 to 12 mm and a height of 3 to 5 mm. In addition, the liquid leading part can be formed by another shape than arch-shaped as long as liquid can be efficiently led to the liquid-absorbing sheet.

Besides, it is more preferable that the surface of the bottom part has proper wettability, because liquid such as urine tends to be more easily led and collected along the arch parts when liquid is contacted with the surface of the bottom part.

For the granular materials, any traditional animal litter can be used, but water-resistant silica gel having a high liquid passing property and a liquid absorption property at the same time is preferable. The grain size of the granular material is 4 to 10 mm, preferably 5 to 8 mm, more preferably 6 to 8 mm. Furthermore, the moisture content is 4 to 15%, preferably 5 to 10% in consideration of the rate of liquid absorption and the liquid passing rate. Since the use of the granular materials like this increases the liquid passing rate, liquid such as urine does not remain in the granular material container, which can prevent the remained urine from becoming rotten and prevent undesirable odors from generating. Furthermore, small amounts of urine droplets do not remain on the surface of the granular materials, because the granular materials like this can absorb liquid remained on the surface of the granular materials. Therefore, proper hygiene and dryness of the animal litter can be maintained. Moreover, since moisture of feces can be removed as well, the granular materials can be prevented from being attached by odors of feces.

Nonwoven fabric, paper and sheeted cotton, liquid-absorbing materials such as water absorbent polymers, silica gel, or crushed pulp can be used as a liquid-absorbing sheet. However, it is preferable that the liquid-absorbing sheet has a water capacity of 400 g/2000 cm², in which an antimicrobial agent such as didecyldimethylammonium adipate of a cationic surfactant, or a bacteriostatic agent such as citric acid is added to prevent odors of urine and prevent urine from becoming rotten. Besides, it is preferable that the liquid-absorbing sheet has a liquid permeable front layer and a liquid impermeable back layer. The front layer absorbs the liquid dripped from the bottom part. The front layer is preferably white to allow the amount and color of animal's urine to be known and the health condition of the animal to be known.

In this specification, 'animals' means not only pet animals like dogs, cats, rabbits and hamsters but also cubs of large-sizes animals such as tigers, lions and bears. Furthermore, 'liquid' means all fluid mass which is evacuated from animals and is capable of passing through the animal litter. 'Liquid' includes moisture contained in feces of animals. 'Liquid passing' means that liquid passes through a certain point of the granular material and moves to the back side of the bottom part. Besides, 'being wet' is a phenomenon that a part of the surface of a solid is replaced in the interface between liquid and the solid when the surface of the solid touches the liquid. 'Wettablity' is easiness that liquid spreads over the surface of a solid. Additionally, 'to be dispersed' is that the granular materials are dispersed on the bottom part and are placed in thickness.

(2) The animal litter box according to (1), wherein the bottom part is gridironed having a plurality of opening parts, and the opening part has dimensions smaller than those of the granular material.

According to this invention, liquid such as urine evacuated from an animal passes through the opening parts in the bottom part and to the back side of the bottom part. Therefore, the liquid does not remain on the bottom of the granular material container. Furthermore, the granular materials stored on the bottom part do not drop downward through the opening parts.

(3) The animal litter box according to (2), wherein an open area ratio of the bottom part occupied by the opening parts is 25 to 50% of an area of the bottom part.

According to this invention, liquid such as urine evacuated from an animal is allowed to smoothly move to the back side of the bottom part through the opening parts, and the strength that the bottom part is not damaged when an animal such as a cat is on it can be kept. When the open area ratio is smaller than 25%, it is likely to soil all of the granular materials, because liquid such as urine evacuated from an animal such as a cat takes time to pass through the bottom part and the liquid spreads all over the bottom part. On the other hand, when the open area ratio is greater than 50%, it is likely that the bottom part is broken when an animal such as a cat is on it because the strength of the bottom part is reduced. Here, 'open area ration' means the ratio of opening part made by opening part to the area of the bottom part.

(4) The animal litter box according to any one of (1) to (3), wherein the bottom part is detachable from the granular material container.

According to this invention, since only the bottom part can be removed from the granular material container and can be washed in changing the granular materials, effort of cleaning can be saved.

(5) The animal litter box according to any one of (1) to (4), wherein the liquid-absorbing sheet has an area greater than that of the bottom part of the granular material container.

According to this invention, liquid such as urine dripping from the bottom part of the granular material container is to surely drop onto the surface of the liquid-absorbing sheet, and thus the liquid does not drop on floor to soil.

(6) The animal litter box according to any one of (1) to (5), wherein the liquid-absorbing sheet holder is loadably incorporated under the bottom part of the granular material container.

According to this invention, since the liquid-absorbing sheet holder is loadably incorporated as a part of the animal litter box, it can be drawn separately without removing the granular material container. Therefore, the work to change the liquid-absorbing sheet that has absorbed liquid such as urine in a saturation state is done easily.

(7) The animal litter box according to any one of (1) to (6), wherein the animal litter box has a drawer structure that can house a drawer body, and the liquid-absorbing sheet holder is the drawer body.

According to this invention, since the liquid-absorbing sheet holder for placing the liquid-absorbing sheet is formed into the drawer body, only the liquid-absorbing sheet holder can be taken out without removing the granular material container. Therefore, when an owner of an animal changes the liquid-absorbing sheet placed on the bottom of the liquid-absorbing sheet holder that has absorbed liquid such as urine in the saturation state, he or she can change the liquid-absorbing sheet only by drawing the liquid-absorbing sheet holder from the granular material container with easy work. The liquid-absorbing sheet holder is in the form of a drawer and the liquid-absorbing sheet is placed on the bottom at a distance from the bottom part of the granular material container. However, since the back side (the side facing the liquid-absorbing sheet) of the bottom part of the granular material container has a liquid leading part formed by connected arches, liquid such as urine is allowed to efficiently move to the liquid-absorbing sheet as described in (1).

(8) The animal litter box according to any one of (1) to (7), wherein the animal litter box has a cover for controlling a direction of an animal going in and out mounted detachably.

According to this invention, it is to serve to prevent an animal such as a cat from going in and out of the place other than the entrance formed by the cover. Moreover, it can also prevent the granular materials from being scattered out when an animal covers the granular materials over urine or feces with the paws after evacuation. For the cover, for example, it is a frame having a nearly rectangular bottom, in which sidewalls are erected on the frame in three sides and an opening for an animal going in and out is formed in the remaining side. The height of the sidewalls is the height that an animal does not jump over and the granular materials are not scattered out when an animal covers the granular materials over urine or feces with the paws, preferably 10 cm or higher, more preferably 10 to 40 cm.

(9) The animal litter box according to (8), wherein a granular material dropper is detachably disposed at a position facing an opening of the cover in the animal litter box.

According to this invention, an animal such as a cat walks on the granular material dropper disposed at the entrance of the opening to go in and out of the animal litter box. Thus, the granular materials attached between and around the toes of the animal are removed by the granular material dropper when the animal goes out of the litter box after evacuation. Therefore, the granular materials are not scattered throughout a room. Furthermore, since the granular material dropper is an accessory of the animal litter box and is detachably attached to the animal litter box, the granular material dropper itself can be taken out easily and cleaned separately from the animal litter box. Thus, it is not troublesome, and effort is reduced.

(10) The animal litter box according to (9), wherein the granular material dropper includes a granular material removing member having a mesh top plate, and a granular material recovery container disposed under the granular material removing member.

According to this invention, an animal such as a cat walks on the granular material removing member of the granular material dropper disposed at the position facing the entrance when it goes out of the animal litter box as the granular materials are attached between and around the toes after it evacuated urine or feces. Thus, the granular materials are removed by the granular material removing member. The removed granular materials drop downward from through holes in the top plate of the granular material removing member, and are recovered in the granular material recovery container. Therefore, the granular materials are not scattered throughout the room because the animal does not bring the granular materials out of the animal litter box.

(11) The animal litter box according to any one of (1) to (10), wherein the granular material has a liquid absorptive capacity wherein a maximum absorbable amount of liquid absorbed by each of the granular materials is 0.3 to 4.0 times as much as its own weight and an amount of liquid absorbed by each of the granular materials per three second is 20 to 70% of the maximum absorbable amount of liquid absorbed by the each granular material, and has a liquid passing ratio of a mass of the granular materials is 70% or more.

According to this invention, since the ratio of liquid passing through the granular materials is high, liquid such as urine does not remain on the bottom of the granular material container, and odors do not occur. Furthermore, since the granular materials themselves absorb the liquid, small amounts of urine droplets do not remain on the surface of the granular materials, it is sanitary, and dryness can be maintained. Moreover, since moisture of feces can be removed as well, odors of feces remaining on the granular materials is to be reduced.

(12) The animal litter box according to any one of (1) to (11), wherein the liquid-absorbing sheet has an antimicrobial and bacteriostatic part having both an antimicrobial property and a bacteriostatic property, or both of an antimicrobial part having an antimicrobial property and a bacteriostatic part having a bacteriostatic property.

According to this invention, since the liquid-absorbing sheet has antimicrobial and bacteriostatic property, odors of urine can be prevented, and urine can be prevented from becoming rotten.

BRIEF DESCRIPTION OF THE DRAWINGS

The teachings of the invention can be readily understood by considering the following detailed description in conjunction with the accompanying drawings, in which:

FIG. 5A is a perspective view seen from the top side and FIG. 5B is a perspective view seen from the back side;

DESCRIPTION OF THE PREFERRED EMBODIMENT

Hereinafter, embodiments of the invention will be described with reference to the drawings. In addition, the invention is not limited by these and the dimensions are properly adjusted for easy understanding in these drawings.

Figure 1:
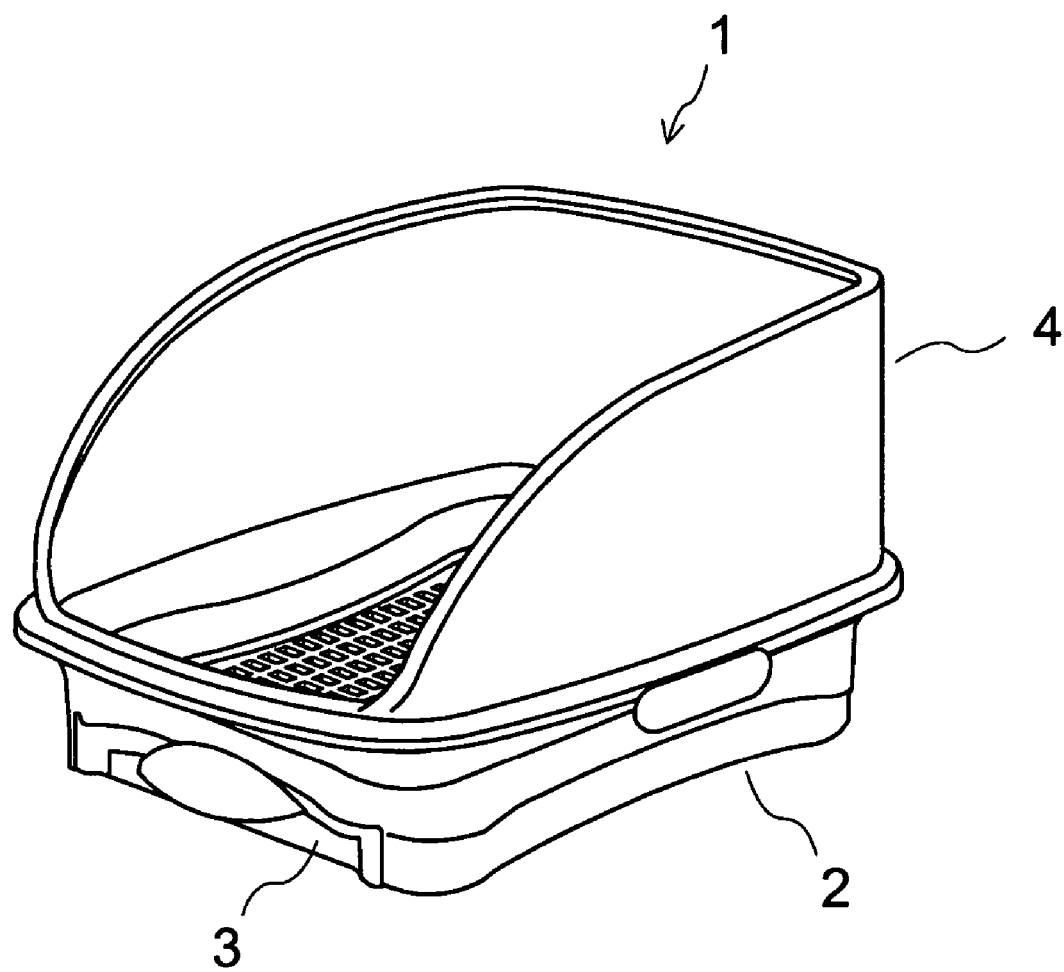
FIG. 1 is a general view illustrating a first embodiment of the animal litter box according to the present invention.
Figure 2:
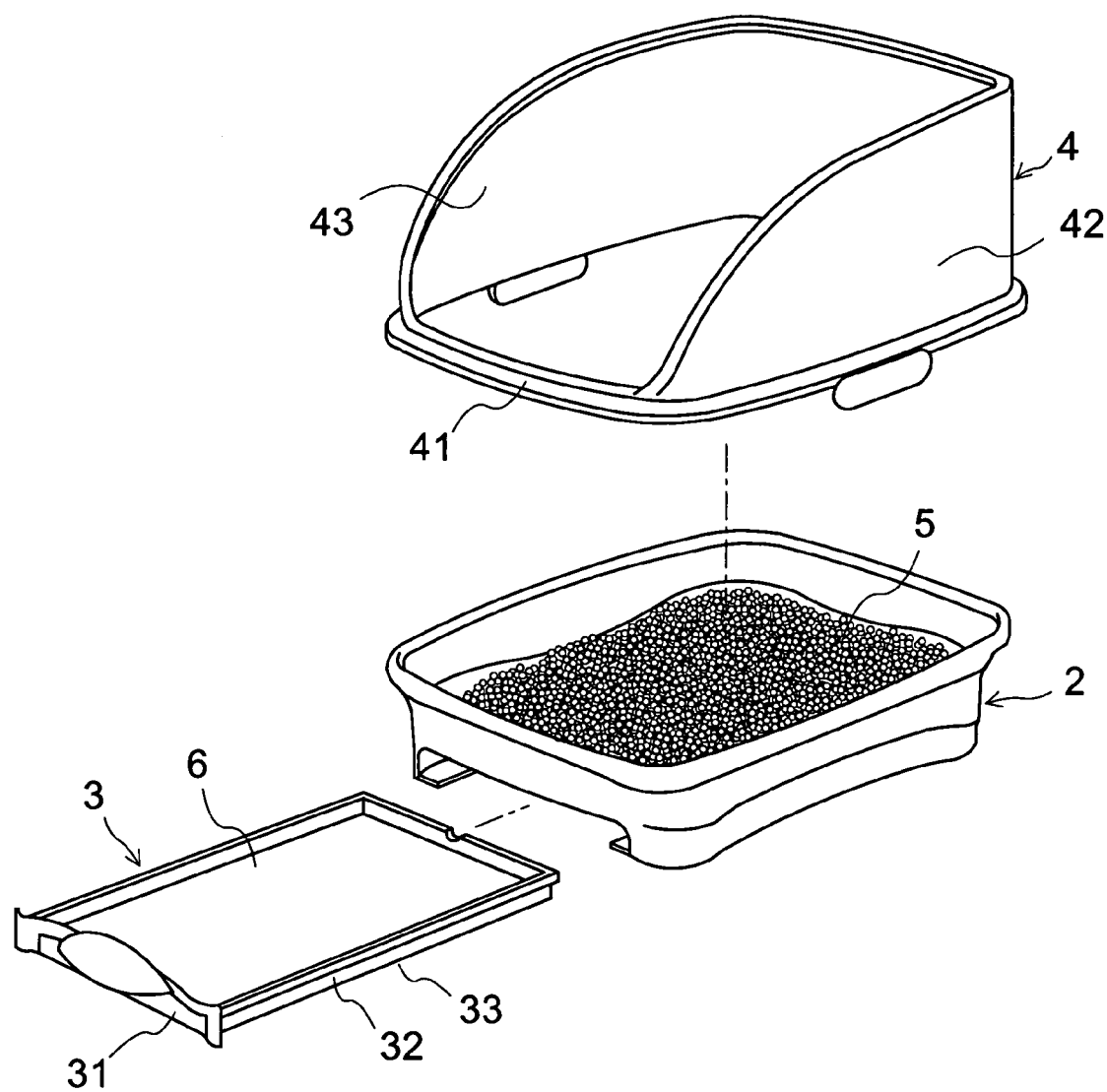
FIG. 2 is an exploded perspective view illustrating an animal litter box of the first embodiment.
Figure 3:
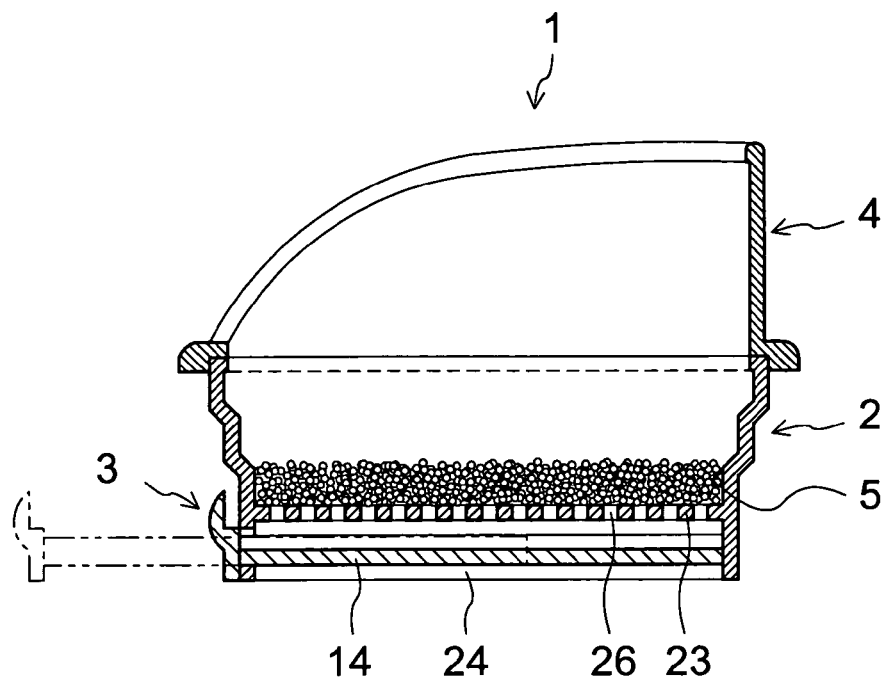
FIG. 3 is a longitudinal cross-sectional view illustrating the animal litter box of the first embodiment.

As shown in FIGS. 1 to 3, an animal litter box 1 according to the present invention is configured to have main components, a box-shaped granular material container 2 for storing granular materials 5, a liquid-absorbing sheet holder 3 loadably incorporated under the granular material container 2 for holding a liquid-absorbing sheet 6, and a cover 4 disposed on the top part of the granular material container 2. A predetermined amount of the granular materials 5 is dispersed in certain thickness on the top of the bottom part 23 of the granular material container 2. The liquid-absorbing sheet 6 is placed in the liquid-absorbing sheet holder 3.

Figure 4:
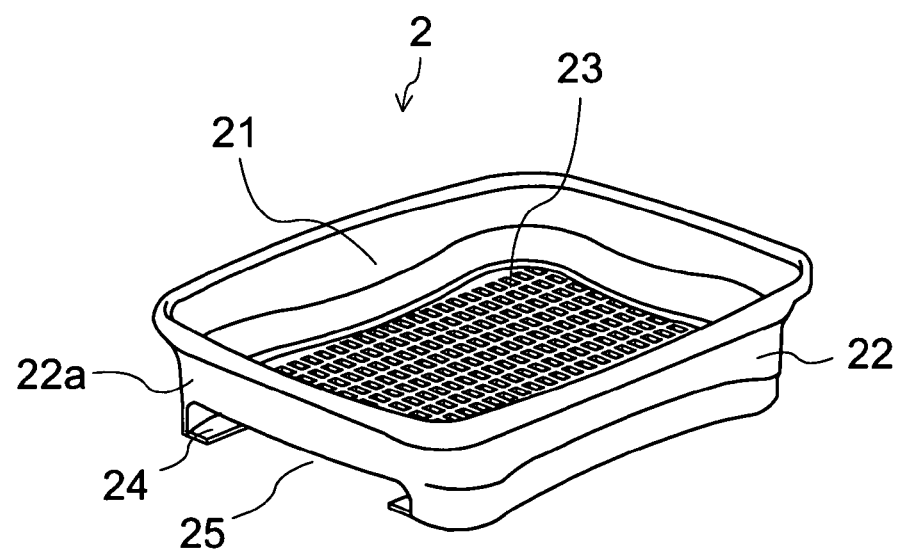
FIG. 4 is a perspective view illustrating a granular material container for storing granular materials.

As shown in FIG. 4, the granular material container 2 has an opening 21 for an animal going in and out, which is configured of four sidewalls 22, the bottom part 23 formed at a predetermined position of the sidewalls 22, and a lower frame 24. The granular material container 2 is formed by molding plastic materials including polyolefine resins such as polyethylene (PE), polypropylene (PP) and polyethylene terephthalate (PET), and metal plates such as stainless steel. Furthermore, among the four sidewalls 22, a drawer opening 25 is formed in a front sidewall 22a (the sidewall on the left side in the drawing) under the bottom part 23.

Figure 5:
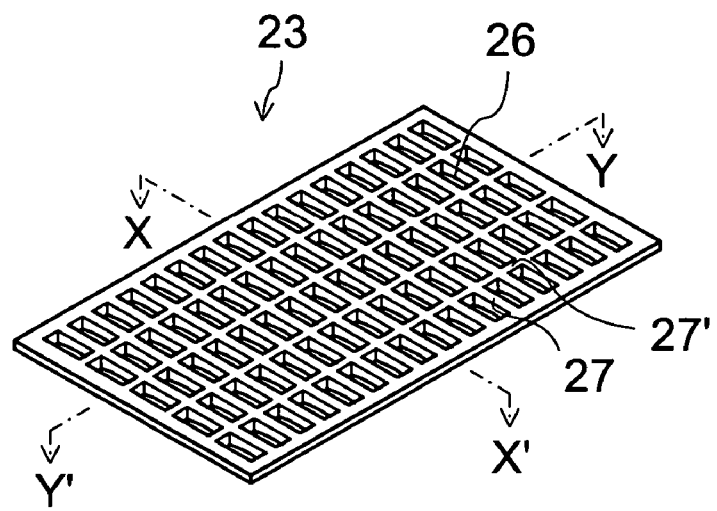
FIGS. 5A and 5B are perspective views illustrating a bottom part of the granular material container.
Figure 5:
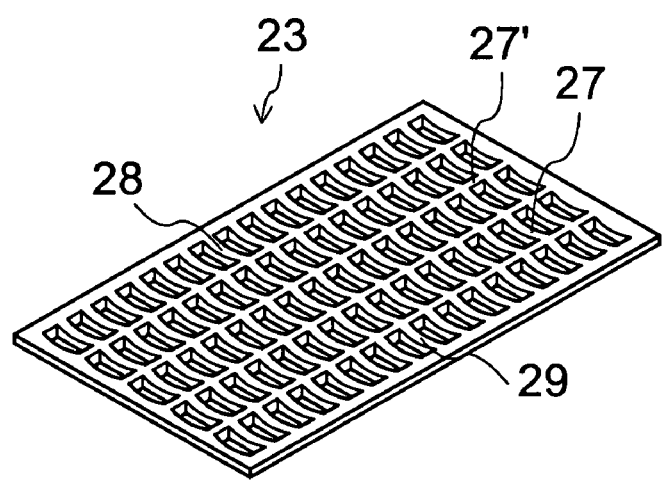
Figure 6:
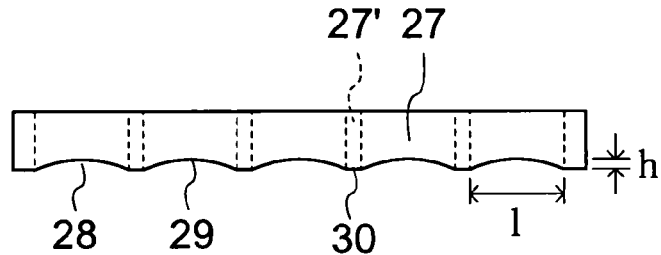
FIG. 6A is a cross-sectional view illustrating X–X' cross section of the bottom part shown in FIG. 5A
FIG. 6B is a cross-sectional view illustrating Y–Y' cross section of the bottom part shown in FIG. 5A.
Figure 6:
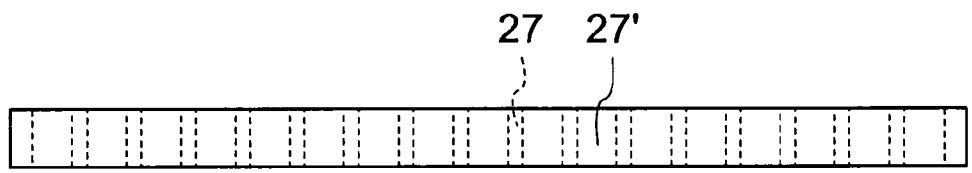
Figure 7:
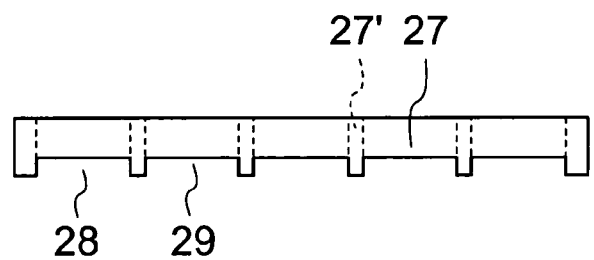
FIGS. 7A and 7B are cross-sectional views illustrating X–X' cross section of a modified example of the bottom part of the granular material container.
Figure 7:
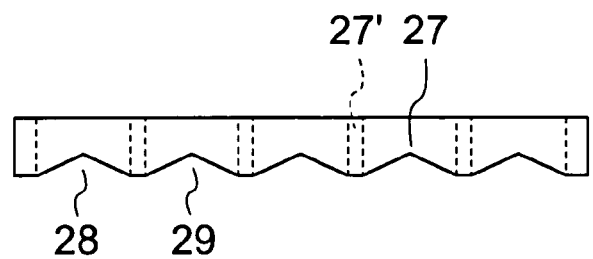

As shown in FIGS. 5A and 5B, the bottom part 23 is formed into gridiron having a plurality of opening parts 26, which is formed into one piece of the granular material container 2 and molded with a plastic material. A liquid leading part 28 formed by connected arch parts 29 is formed on the back side (the side facing the liquid-absorbing sheet 6) of the bottom part 23. The bottom part 23 has lateral bridges 27 in the width direction and longitudinal bridges 27' in the longitudinal direction which make the bottom part 23 to be the grid-like shape as shown FIG. 6A and FIG. 6B. FIG. 6A is a cross-sectional view illustrating X–X' cross section of the bottom part shown in FIG. 5A and FIG. 6B is a cross-sectional view illustrating Y–Y' cross section of the bottom part shown in FIG. 5A In this embodiment, the arch parts 29 are formed on the back side of the lateral bridges 27. As shown in FIG. 6A, the arch part 29 comprising the liquid leading part 28 is an arch that height h is about 4 mm and chord length l is about 8 mm. In addition, it is preferable that the height of the arch is 3 to 5 mm and the chord length of the arch is 6 to 12 mm, but it is not limited to this as long as the liquid leading part is formed such a shape that can easily lead liquid. For example, it is acceptable to have prismatic projecting parts 30 as shown in FIG. 7A. Alternatively, it is fine to form into a reverse V-shape as shown in FIG. 7B.

Furthermore, the liquid leading part 28 is formed on the lateral bridges 27 of the bottom part 23 in the width direction in the embodiment, but it is acceptable to form the liquid leading part 28 on longitudinal bridges 27' in the longitudinal direction. Moreover, it is fine to form the liquid leading part 28 on both lateral bridges 27 and longitudinal bridges 27' in the lateral and longitudinal directions. It is preferable to form the liquid leading part 28 on the lateral bridges 27 and the longitudinal bridges 27' in both directions because liquid is led more efficiently. Besides, in this case, it is more preferable that liquid collects on the liquid leading part 28 from each of the bridges 27 and 27' and easily drops onto the liquid-absorbing sheet by projecting the portions where the bridges 27 and 27' in both directions intersect with each other.

Figure 8:
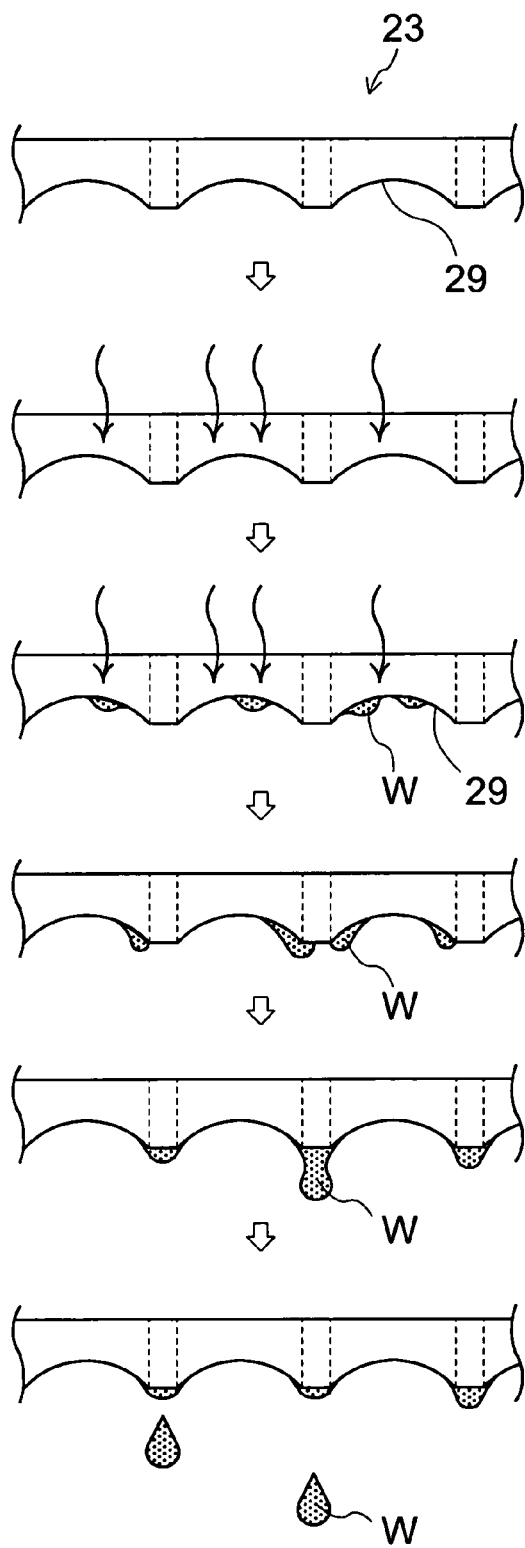
FIG. 8A is an explanatory drawing illustrating a state of liquid movement in arch parts and FIG. 8B is an explanatory drawing illustrating a state of liquid movement in the traditional animal litter box.
Figure 8:
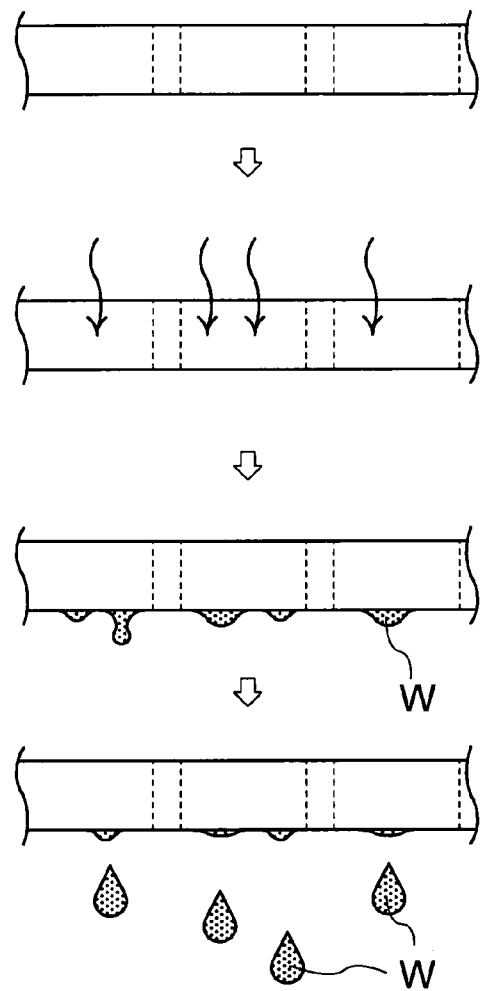

Liquid such as animal urine is evacuated onto the granular materials 5 shown in FIG. 2, passes through the bottom part 23, and drips onto the liquid-absorbing sheet 6 placed under the bottom part 23. The liquid such as animal urine having passed through among the granular materials 5 and moved to the arch parts 29 on the back side of the bottom part 23 efficiently aggregates on the projecting parts 30 formed by connecting the arch parts 29 each other along the arches, and drips onto the liquid-absorbing sheet 6 in large liquid drops W, as shown in FIG. 8A. Therefore, the evacuated liquid such as urine is delivered from the bottom part 23 quickly.

Figure 9:
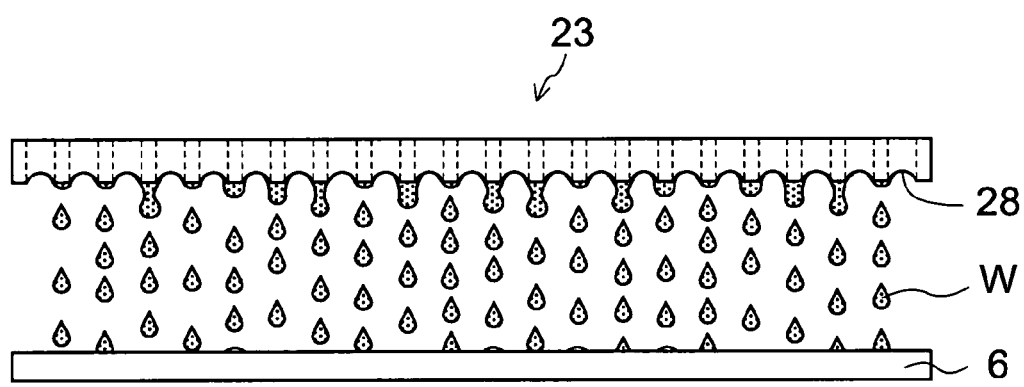
FIG. 9 is a schematic diagram illustrating a state of liquid dripping like raindrops from a liquid leading part.

On the other hand, since the traditional product as shown in FIG. 8B does not have the liquid leading parts as in the present invention on the back side of the bottom part, liquid having moved to the back side cannot efficiently drip downward and the evacuated liquid such as urine is likely to aggregate on the bottom part. Furthermore, since the liquid leading part 28 is formed by a plurality of the arch parts 29 connected each other, liquid is widely dispersed by the liquid leading part 28 when it moves to the back side of the bottom part 23, and liquid drops all over the liquid-absorbing sheet 6 as it is dispersed as shown in FIG. 9. Accordingly, the liquid absorption efficiency of the liquid-absorbing sheet 6 is improved. Additionally, it can be prevented that unevenly absorbed liquid causes a saturation state in a certain part of the liquid-absorbing sheet 6 to shorten a period of time to change the liquid-absorbing sheet 6 can be prevented.

The size of the opening part 26 formed in the bottom part 23 (that is, the distance between the adjacent bridges 27 or 27') has dimensions smaller than the minimum dimensions of the granular materials 5 that are dispersed on the top of the bottom part 23, and the granular materials 5 are prevented from dropping downward from the opening parts 26. For example, when granular materials 5 having a diameter of 4 to 8 mm are used, the size of the opening part 26 is set to have a short side length of about 3 mm. When granular materials 5 are in a columnar shape having a diameter of 5 mm and a length of 7 mm, the size of the opening part 26 is set to have a short side length of about 4 mm. More specifically, the size of the opening part 26 preferably has a short side length of 2 to 6 mm and a long side length of 3 to 5 mm. In addition, it is fine to select the size in accordance with the size of the granular materials 5 to be used. Furthermore, an open area ratio (the ratio of the total opening area to the area of the bottom part) is 25 to 50%, preferably 40 to 45%. When the open area ratio is smaller than 25%, it is likely to soil all the granular materials because liquid such as urine evacuated from an animal such as a cat takes time to pass through the bottom part 23, and the liquid spreads over the granular materials 5 placed on the bottom part 23. Moreover, when the open area ratio is greater than 50%, it is likely that the bottom part 23 is broken when an animal such as a cat is on it because of the strength of the bottom part 23 is reduced.

The bottom part 23 preferably has surface wettability. When the surface of the bottom part 23 has wettability, liquid such as urine touches the bottom part 23 and spreads at a proper degree to easily aggregates on the projecting parts 30 (the portions where the lateral bridges 27 intersect with the longitudinal bridges 27') formed by connected arch parts 29 along the arch parts 29 of the liquid leading part 28. Therefore, liquid efficiently drips downward from the bottom part 23. As a scheme to provide the surface wettability, schemes are named that a surface active agent such as an antistatic agent or nonionic surface active agent is applied to the surface of the lateral bridges 27 and longitudinal bridges 27' forming the opening parts 26 of the bottom part 23, or is mixed in a plastic raw material in molding.

The bottom part 23 is formed into one piece with the granular material container 2 in this embodiment, but the bottom part 23 can be formed separately from main frame of the granular material container. In this case, not shown in the drawing, it is acceptable that a support bar for supporting the bottom part is disposed at a predetermined position inside the sidewalls of the granular material container over the entire circumference and the bottom part is placed on the support bar. Thus, the bottom part is detachable, and can be cleaned alone.

As shown in FIG. 2, the liquid-absorbing sheet holder 3 is a box in a drawer shape configured of a bottom plate part 33, a side plate part 32 in three sides erected on the rim of the bottom plate part 33, and a front plate part 31. As similar to the granular material container 2, the liquid-absorbing sheet holder 3 is formed by molding plastic materials including polyolefine resins such as polyethylene (PE), polypropylene (PP) and polyethylene terephthalate (PET), and metal plates such as stainless steel. The liquid-absorbing sheet holder 3 is a drawer body disposed under the granular material container 2 and is loadable from the drawer opening 25 formed in the granular material container 2. Chain double-dashed lines in FIG. 3 depict a state that the liquid-absorbing sheet holder 3 is drawn. Furthermore, the front plate part 31 has the same size as that of the drawer opening 25 of the granular material container 2 or greater than that, which is configured to block the drawer opening 25 when the liquid-absorbing sheet holder 3 is housed in the granular material container 2. Thus, odors of urine absorbed into the liquid-absorbing sheet 6 are prevented from leaking out. Moreover, the bottom plate part 33 is formed to have the same size as that of the bottom part 23 of the granular material container 2 or greater than that. In this case, since the liquid-absorbing sheet 6 housed in the liquid-absorbing sheet holder 3 having the same size as that of the bottom part 23 of the granular material container 2 or greater than that can be used, liquid such as urine dripping from the bottom part 23 surely drops onto the liquid-absorbing sheet 6 for absorption.

As shown in FIG. 2, the cover 4 is a frame body that has a nearly rectangular bottom frame 41 as a bottom, a wall body 42 erected on the bottom frame 41 in three sides and a cover opening 43 for an animal going in and out formed in the remaining side. The cover 4 is formed by molding plastic materials including polyolefine resins such as polyethylene (PE), polypropylene (PP) and polyethylene terephthalate (PET), and metal plates such as stainless steel. The bottom frame 41 has almost the same size as that of the top end part of the granular material container 2, which is formed to be fit to the top end part of the granular material container 2. The height of the wall body 42 is at least 10 cm or higher, preferably 10 to 40 cm so as to prevent the granular materials 5 from being scattered out when an animal covers the granular materials 5 over urine or feces with paws after evacuation, and prevent an animal from going in and out through the place other than the cover opening 43.

In addition, the animal litter box 1 of this embodiment has the structure that the cover 4 is placed and fit to the top part of the granular material container 2, but it is acceptable not to provide the cover 4.

For the granular materials 5, water-resistant silica gel is preferable that the maximum absorbable amount of liquid absorbed by each of the granular materials is 0.3 to 4.0 times as much as its own weight, an amount of liquid absorbed by each of the granular materials for a few time is 0.1 to 1.5 times as much as its own weight, an amount of liquid absorbed by each of the granular materials for a short time is 20 to 70% of the maximum absorbable amount of liquid absorbed by the each granular material, and a liquid passing ratio of the granular materials is 70% or greater. The grain size of the granular materials 5 is in a columnar shape or sphere shape 4 to 10 mm, preferably 5 to 8 mm, more preferably 6 to 8 mm. When the grain size is smaller than 4 mm, spaces among the granular materials become small, the surface area is increased, and the opening area of the opening part 26 in the bottom part 23 of the granular material container 2 needs to be reduced. Therefore, a liquid passing ratio is reduced, and a lot of urine remains in the granular material container 2 to cause the occurrence of odors for a short time. On the other hand, when it is greater than 10 mm, an animal such as a cat dislikes it and does not evacuate on them. Furthermore, the moisture content of the granular material is 4 to 15%, preferably 5 to 10%. When the moisture content is lower than 4%, the rate of absorption is accelerated to reduce a liquid passing ratio.

When the granular materials 5 like this are used as an animal litter, the liquid passing ratio increases and liquid such as urine does not remain in the bottom of the granular material container to prevent the occurrence of odors. Moreover, it is sanitary because small amounts of urine droplets do not remain on the surface of the granular materials due to absorption, and dryness can be maintained. Besides, it is preferable that moisture of feces can be removed to reduce odors of feces.

Here, the maximum absorbable amount of liquid is measured like this; 100 g of the granular materials was placed in a mesh container having a size that the granular materials did not overlap and it was immersed in physiological salt solution for five minutes. Then the container was taken out, extra moisture was removed sufficiently, and an amount of liquid absorbed by the granular materials was measured as the maximum absorbable amount of liquid. Furthermore, an amount of liquid absorbed by each of the granular materials for a short time is measured like this; 100 g of the granular materials was similarly placed in a mesh container having a size that the granular materials did not overlap, it was immersed in physiological salt solution for three seconds. Then the container was taken out, extra moisture was removed sufficiently, and an amount of liquid absorbed into the granular materials was measured as the amount of liquid absorbed by each of the granular materials for a short time. Moreover, a liquid passing ratio is measured like this; the granular materials was placed in a thickness of 25 mm in a container 20 cm wide, 20 cm deep and 5 cm high having the bottom part set to have an open area ratio of 50% (the thickness is 5 mm, and the opening part is 3×5 mm), 20 ml of physiological salt solution was dropped by a buret for five second, and an amount of liquid absorbed into the liquid-absorbing sheet placed under the container was measured.

In addition, the granular materials 5 are not limited to the above. It is acceptable to use traditional animal litter in a columnar shape or sphere shape having outer dimensions of about 2 to 4 mm made of resins such as polypropylene (PP), and inorganic materials such as synthetic zeolite, natural zeolite and glass.

Figure 10:
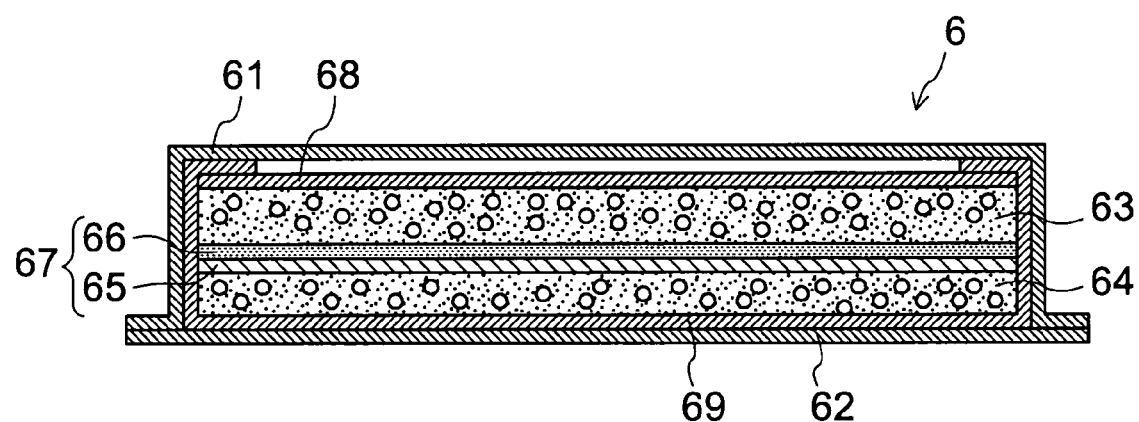
FIG. 10 is a cross-sectional view in the thickness direction illustrating the configuration of a liquid-absorbing sheet.

As shown in FIG. 10, the liquid-absorbing sheet 6 has a liquid permeable front layer 61 and a liquid impermeable back layer 62. An upper absorption layer 63 and a lower absorption layer 64 having liquid absorbing ability are formed between the liquid permeable front layer 61 and the liquid impermeable back layer 62. The liquid permeable front layer 61 is white, and the liquid impermeable back layer 62 is colored. An antimicrobial and bacteriostatic part 67 formed by an antimicrobial part 65 and a bacteriostatic part 66 contacting each other is disposed between the upper absorption layer 63 and the lower absorption layer 64. The upper absorption layer 63 and the lower absorption layer 64 contain pulp and a super absorbent polymer. An upper layer tissue 68 is sandwiched between the upper absorption layer 63 and the liquid permeable front layer 61, and an under layer tissue 69 is sandwiched between the lower absorption layer 64 and the liquid impermeable back layer 62. The upper layer tissue 68 and the under layer tissue 69 are both white. The antimicrobial part 65 is formed to contain an antimicrobial property imparting ingredient such as didecyldimethylammonium adipate, a kind of a cationic surfactant. The bacteriostatic part 66 is formed to contain a bacteriostatic property imparting ingredient such as citric acid that is highly safe as a pH control agent.

When the liquid-absorbing sheet like this is used, the occurrence of odors of urine can be prevented or urine can be prevented from becoming rotten, and the liquid-absorbing sheet can be used longer because the sanitary condition of the liquid-absorbing sheet can be kept.

In addition, the liquid-absorbing sheet 6 is not limited to the above. It is acceptable to use liquid-absorbing sheets generally used for animals including liquid-absorbing sheets such as nonwoven fabric, paper and sheeted cotton, and liquid-absorbing materials such as water absorbent polymers and silica gel, and crushed pulp.

Next, a second embodiment of the animal litter box according to the present invention will be described.

Figure 11:
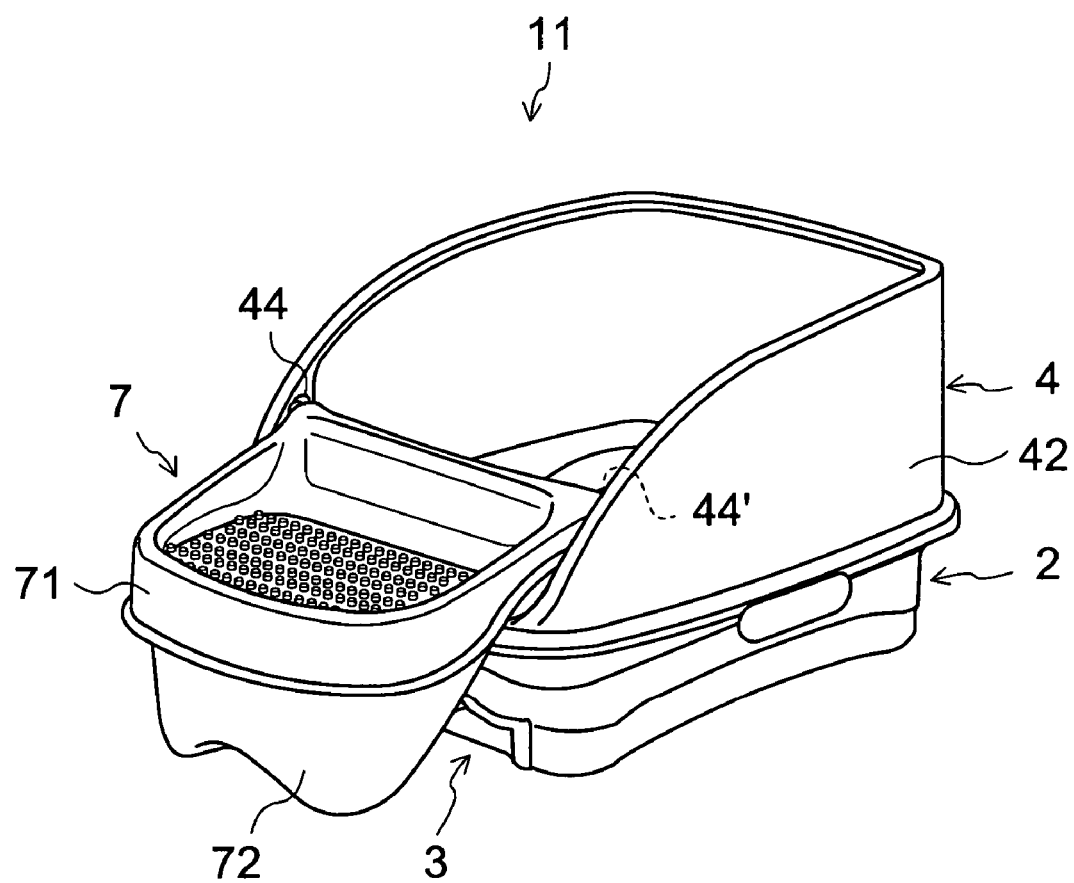
FIG. 11 is a general perspective view illustrating the animal litter box of the first embodiment provided with a granular material dropper.
Figure 12:
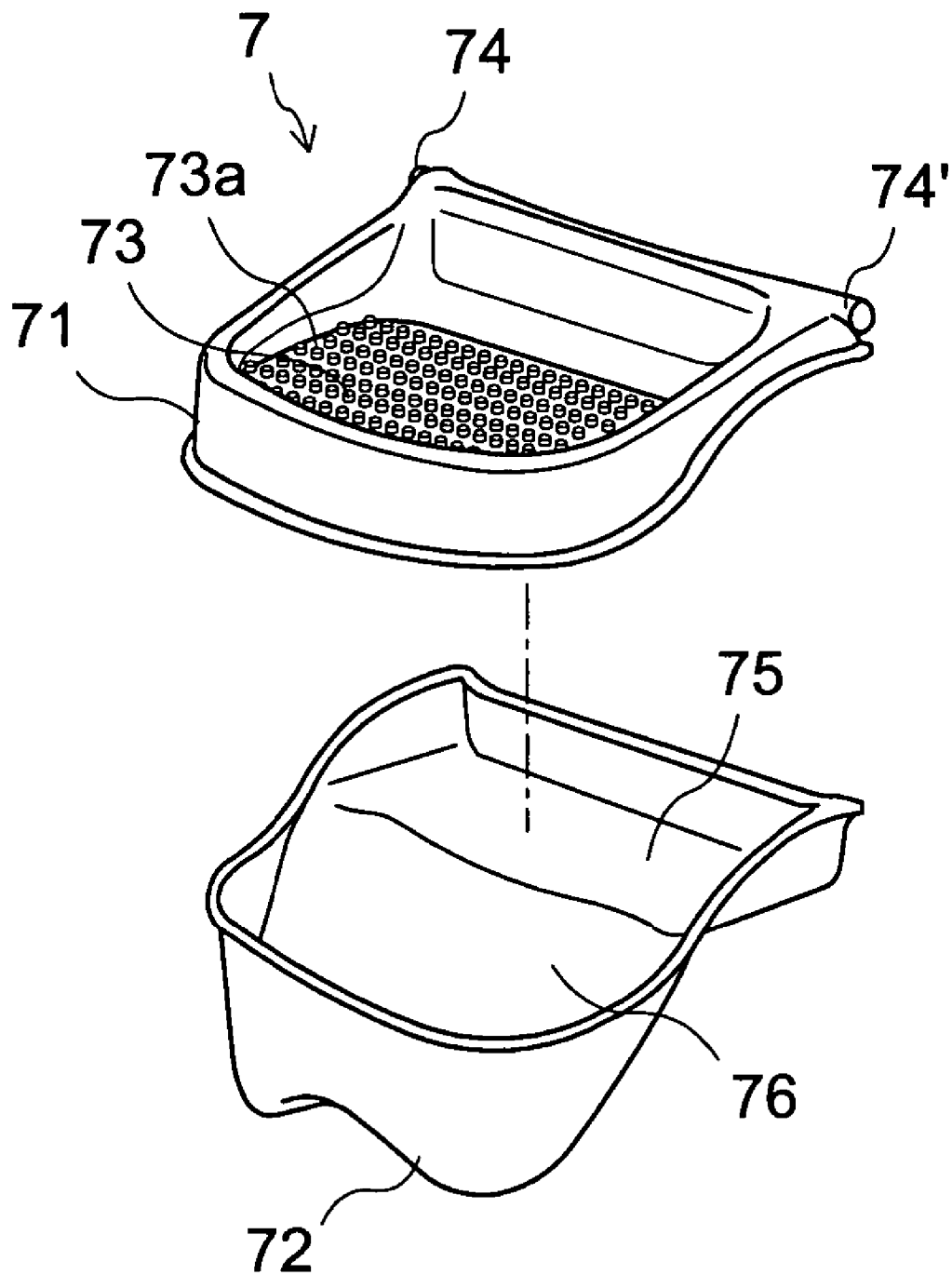
FIG. 12 is an exploded perspective view illustrating the granular material dropper.

FIG. 11 is a general perspective view illustrating an animal litter box 11 where a granular material dropper is provided in the animal litter box 1 of the first embodiment 1. FIG. 12 is an exploded perspective view illustrating the granular material dropper of the granular material dropper shown in FIG. 11. In the embodiment below, the same components as those of the first embodiment are designated the same reference numeral and signs, omitting the overlapping description. Additionally, the dimensions are adjusted properly for easy understanding in these drawings.

The animal litter box 11 of the second embodiment is provided with a granular material dropper 7 in the embodiment shown in FIG. 1.

As shown in FIG. 11, the granular material dropper 7 is detachably mounted on a cover 4 in front of a granular material container 2 and the cover 4 (the side of an animal going in and out on the left in the drawing). For example, in this embodiment, a pair of engagement holes 44 and 44' is formed in two walls 42 facing each other among three walls of the cover 4, and a pair of projections 74 and 74' is formed on a granular material removing member 71 of the granular material dropper 7 (see FIG. 12). The projections 74 and 74' are inserted into the engagement holes 44 and 44' of the cover 4, and then the granular material dropper 7 is detachably mounted on the cover 4. In addition, mounting is not limited to this.

As shown in FIG. 12, the granular material dropper 7 is configured of the granular material removing member 71 and a granular material recovery container 72 for recovering sand (the granular materials) dropped by the granular material removing member 71. The granular material recovery container 72 is disposed under the granular material removing member 71. The granular material dropper 7 is also formed by molding plastic materials including polyolefine resins such as polyethylene (PE), polypropylene (PP) and polyethylene terephthalate (PET) and metal plates such as stainless steel.

A top plate 73 is disposed in the bottom of the granular material removing member 71, and the top plate 73 has a plurality of through holes 73a in a mesh. The shape of the through hole 73a is not limited to any shapes including polygons such as a circle, an ellipse, a rectangle and other shapes, and the arrangement is not limited to any arrangements including a mesh, a grid and other shapes. Furthermore, any size is acceptable as long as paws of an animal such as a cat do not drop from the through holes 73a when the animal walks thereon and the granular materials drop from the through holes 73a. More specifically, it is preferably 5 to 15 mm, more preferably about 10 mm.

Moreover, a flat part 75 disposed so as to be placed on a bottom frame 41 of a granular material container 2 and a slope part 76 adjacent to the flat part 75 are formed in the granular material recovery container 72. A part of the flat part 75 is disposed so as to be placed on the top of granular materials 5 dispersed in the granular material container 2. The granular material removing member 71 and the granular material recovery container 72 are detachably fit to each other.

Therefore, with the provision of the granular material dropper 7, an animal mounts on the granular material removing member 71 of the granular material dropper 7 when the animal goes out of the animal litter box 11 after evacuation, and the animal instinctively opens the toes for balance because of the through holes 73a. Then, the granular materials attached between and around the toes are removed and dropped to the granular material recovery container 72 disposed below. Furthermore, the dropped granular materials 5 slip down the slope part 76 of the granular material recovery container 72 and gathered on one side for recovery, and the granular materials 5 can be prevented from scattering throughout a room.

As described above, the animal litter box according to the invention has been described specifically with reference to the drawings showing the examples. However, the invention is not limited to the examples shown in the drawings, which can be modified properly in the scope applicable to the teachings. Any modifications are included in the technical field of the invention.

As described above, the animal litter box according to the invention is configured of the granular material container for storing the granular materials and the liquid-absorbing sheet holder for housing the liquid-absorbing sheet for absorbing urine, in which the liquid leading part formed by a plurality of connected arches is disposed in the bottom part of the granular material container on the side facing the liquid-absorbing sheet. Therefore, urine evacuated by an animal such as a cat onto the granular materials passes through the liquid penetrating bottom part and moves to the back side of the bottom part (the side facing the liquid-absorbing sheet). It is efficiently collected along the liquid leading part formed by connected arches on the back side of the bottom part, and drips onto the liquid-absorbing sheet disposed below for absorption. Furthermore, since the liquid-absorbing sheet is not in contact with the bottom part of the granular material container, liquid such as urine having been absorbed into the liquid-absorbing sheet does not return back to the bottom part. Thus, since all of the granular materials are unlikely to soil, the number of times to change the granular materials can be reduced, there is no effort, and an amount of waste can be reduced.

Moreover, the bottom part can be separated from the granular material container to allow the litter box to be cleaned separately from a litter box main body. Therefore, effort in cleaning is more simplified.

Besides, the cover is disposed in the animal litter box, which can lead an animal to the granular material dropper to remove the granular materials when the animal goes in and out of the litter box main body, and can prevent the granular materials attached to the animal from soiling a room.

In addition, since the granular material dropper is separated from the litter box main body, it can be cleaned separately from the litter box main body in cleaning the litter box. Therefore, there is no effort to keep it cleaned, and the effort to do so is also reduced.

What is claimed is:

1. An animal litter box comprising:
    a granular material container having an opening for an animal going in and out, and a liquid passing bottom part on which granular materials are dispersed;
    and a liquid-absorbing sheet holder placed under the bottom part of the granular material container on which a liquid-absorbing sheet is placed,
    wherein the bottom part of the granular material container comprises a grid of connected first bar elements and second bar elements, the second bar elements defining arches on a side of the bottom part facing the liquid-absorbing sheet, the arches having end portions that coincide with the first bar elements and central portions that are spaced further from the liquid-absorbent sheet holder than the end portions so a liquid passing through a granular material provided on the bottom part will be directed by the arches toward the ends of the arches.

2. The animal litter box according to claim 1, wherein the bottom part comprises a plurality of openings having dimensions smaller than those of the granular material.

3. The animal litter box according to claim 2, wherein an open area ratio of the opening of the bottom part occupied by the opening parts is 25 to 50% of an area of the bottom part.

4. The animal litter box according to claim 1, wherein the bottom part is detachable from the granular material container.

5. The animal litter box according to claim 1, wherein the liquid-absorbing sheet has an area greater than that of the bottom part of the granular material container.

6. The animal litter box according to claim 1, wherein the liquid-absorbing sheet holder is loadably incorporated under the bottom part of the granular material container.

7. The animal litter box according to claim 1, wherein the animal litter box has a drawer structure that houses the liquid-absorbing sheet holder.

8. The animal lifter box according to claim 1, wherein the animal litter box has a removable cover for controlling a direction of an animal entering and exiting the litter box.

9. The animal litter box according to claim 8, where in a granular material dropper is detachably disposed at a position facing an opening of the cover in the animal litter box.

10. The animal litter box according to claim 9, wherein the granular material dropper includes a granular material removing member having a mesh top plate, and a granular material recovery container disposed under the granular material removing member.

11. The animal litter box according to claim 1 in combination with a granular material having a liquid absorptive capacity wherein a maximum absorbable amount of liquid absorbed by each granule of the granular material is 0.3 to 4.0 times as much as its own weight an amount of liquid absorbed by each granule of the granular material per three second is 20 to 70% of the maximum absorbable amount of liquid absorbed by each granule of the granular material and the granular material has a liquid passing ratio of a mass of the granular materials is 70% or more.

12. The animal litter box according to claim 1, wherein the liquid-absorbing sheet has an antimicrobial and bacteriostatic part having both an antimicrobial property and a bacteriostatic property.

13. The animal litter box according to claim 1, wherein the liquid-absorbing sheet has an antimicrobial part having an antimicrobial property and a bacteriostatic part having a bacteriostatic property.

* * * * *